J. CAMPBELL.
Assignor to THE STANLEY RULE AND LEVEL COMPANY.
BENCH PLANE.
No. 10,394. Reissued Oct. 23, 1883.
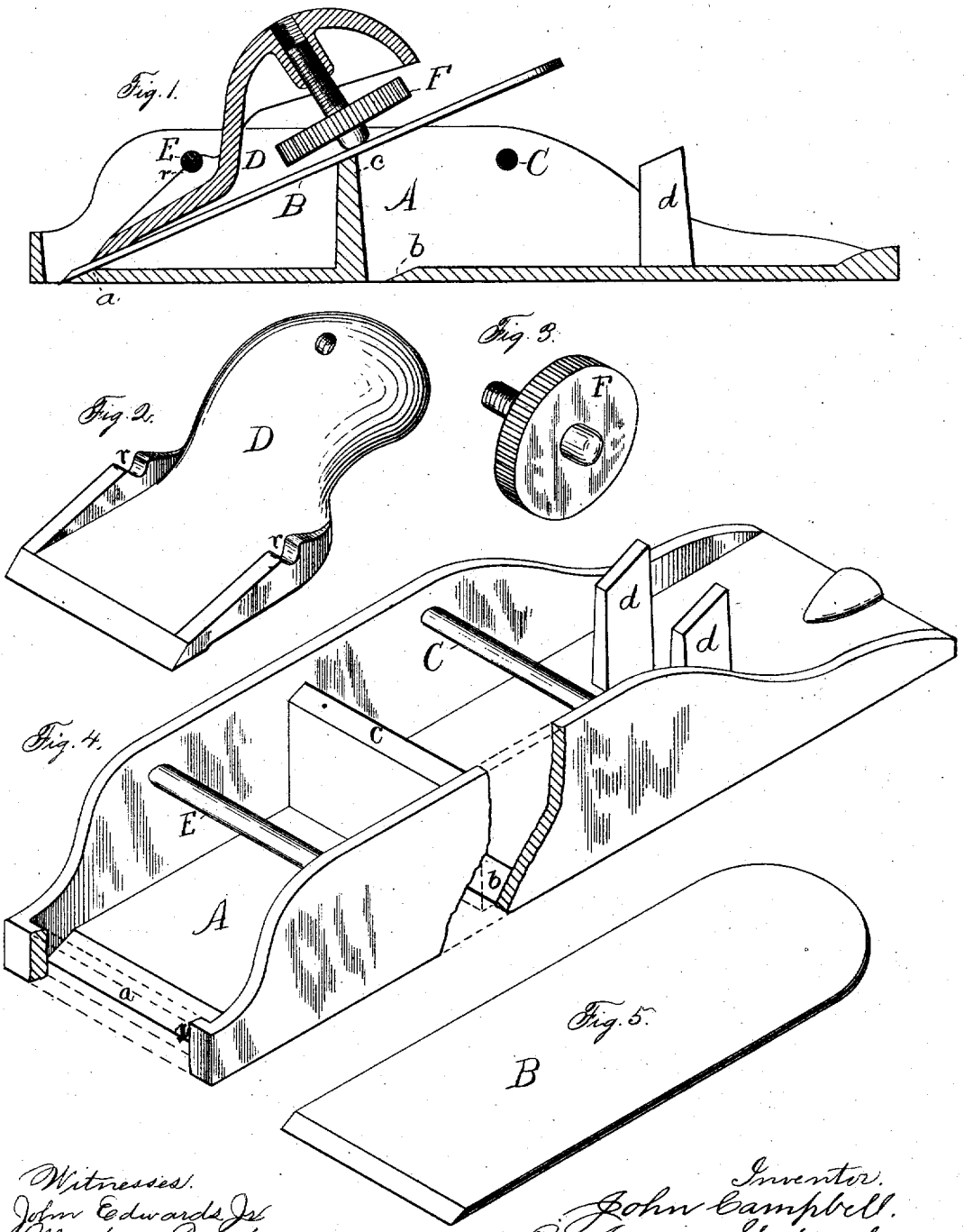
Witnesses.
John Edwards Jr.
Martin Pond
Inventor.
John Campbell.
By James Shepard
Atty
N. PETERS, Photo-Lithographer, Washington, D. C.

UNITED STATES PATENT OFFICE.

JOHN CAMPBELL, OF WALDEN, NEW YORK, ASSIGNOR TO THE STANLEY RULE AND LEVEL COMPANY, OF NEW BRITAIN, CONNECTICUT.

BENCH-PLANE.

SPECIFICATION forming part of Reissued Letters Patent No. 10,394, dated October 23, 1883.

Original No. 271,219, dated January 30, 1883. Application for reissue filed March 23, 1883.

*To all whom it may concern:*

Be it known that I, JOHN CAMPBELL, of Sheffield, England, and a resident of Walden, in the town of Montgomery, in the county of Orange and State of New York, have invented certain new and useful Improvements in Bench-Planes; and I do hereby declare the following to be a full, clear, and exact description of the invention, such as will enable others skilled in the art to which it pertains to make and use the same.

My invention relates to planes, the object being to provide a plane adapted for use in planing a flat surface, either as an ordinary block-plane or hand-plane, with its cutting-bit in the ordinary position in the stock, or with its cutting-bit placed at one end of the stock, so that it may be used in corners and cramped places in which a plane with the bit in the former position cannot be used.

In the accompanying drawings, Figure 1 is a sectional view of my plane, partly in elevation, the plane of section extending longitudinally through the middle thereof. Fig. 2 is a perspective view of the cap. Fig. 3 is a like view of the clamping-screw; Fig. 4, a like view of the stock, and Fig. 5 a like view of the cutting-bit or plane-iron.

A designates the flat-bottomed stock, having at its forward end the beveled seat *a*, for the cutting-bit B, and farther back, near the middle of its length, a like seat, *b*, for the same bit. The stock A is also provided with beveled rests *c* and *d*, the inclined upper surfaces of which rests constitute, respectively, a continuation of the transverse seats *a* and *b*, and may be considered as parts thereof. The seats *a* and *b* are separate and independent seats, located in different geometrical planes in contradistinction to two parts of one seat located in one geometrical plane—as, for instance, the seat *b* and upper surface of the rest *d*. Said stock, in its general features, is an ordinary form of cast-metal plane-stocks, and is provided with a transverse rod, C, for holding the cap D in place when the bit is clamped upon the bit-seat *b*, and a like rod, E, for use in clamping the bit upon the bit-seat *a*. The cap D is provided with recesses *r r*, to engage the under sides of said rods C and E, and with a clamping-screw, F, for clamping the bit between its seat and said cap, as shown in Fig. 1.

In Fig. 4 the extreme front end of the stock and a portion at one side are represented as broken away in order to better show the bit-seats *a* and *b*.

I am aware that planes having a cutting-bit located at or near the forward end of their stock for planing in corners and cramped places are old, said planes having no provision for locating the bit elsewhere. These are oftentimes called "bull-nose" planes, and an example of them may be seen in patent to G. Mueller, No. 55,207, May 29, 1866.

I am also aware that a plane having a single bit, bit-seat, and beveled rest, a transverse rod, a cap, and a clamping-screw, substantially like those herein lettered, respectively, B, *b*, *d*, C, D, and F, was old and well known prior to the date of my invention. Examples of such planes may be seen in the patent to G. F. Evans, No. 41,983, March 22, 1864, and to J. A. Traut, No. 159,865, February 16, 1875.

I am also aware that matching-tools and other planes have been made with two bit-seats and two bits, but without having either bit and its seat located with any particular reference to the end of the stock, examples of which matching-tools may be seen in the patent to J. A. Woodbury, No. 7,432, June 11, 1850, and to J. Herman, August 27, 1835, and an example of other planes with two bits may be seen in patent to J. Sawyer, No. 60,265, December 4, 1866. All of said prior art is hereby disclaimed.

It will be noticed that I employ, in connection with suitable bit-clamping mechanism, two seats for the bit, one of which seats is located in its ordinary position within the stock, while the other is at the one end thereof, or just as near the end as is practicable and leave a bridge for forming the throat in front of the cutting end of the bit, and that the bit and its clamping mechanism are adapted for use in connection with either of the bit-seats *a* or *b*, as may be desired.

The bit and its clamping mechanism may be removed from one bit-seat and secured upon the other bit-seat, when desired. It should also be noticed that when the cutting-bit and clamping mechanism are used in connection with either of the seats the presence in the stock of the other seat and its appurtenances in no way interferes with such use or in any way renders the use of the plane inconvenient. By my improvements I produce a single instrument which is specially adapted for and capable of doing all the work which has heretofore required the employment of two separate and distinct instruments. The cost of my tool over a common hand or block plane is almost nothing, while the convenience of having but one plane to carry, instead of two, for doing the same work will be readily appreciated. It is deemed unnecessary to describe in detail the construction and mode of operation of those parts herein shown which are common to prior planes.

I claim as my invention—

1. The herein-described convertible plane, consisting of stock, bit, and clamping mechanism combined, adapted, when in its normal condition, for all the uses of the ordinary hand or block plane, and provided, also, with an extra bit-seat located at one end of the stock, into which seat the ordinary bit and clamping mechanism may be secured to convert the plane into one specially adapted for use in planing up against a corner, substantially as described, and for the purpose specified.

2. The combination, with the stock provided with two transverse slots, one of which latter is situated near the extreme front end thereof, the beveled rests *c* and *d*, and the transverse rods E and C, of the removable bit, the wedge D, having the slotted side ears, *r*, and the fastening-screw, all of the above parts combined and adapted for the purpose set forth.

JOHN CAMPBELL.

Witnesses:
EDWARD WHITEHEAD,
GEO. WELLER, JR.